United States Patent [19]

Northup

[11] 3,926,401
[45] Dec. 16, 1975

[54] THREAD MOLD

[76] Inventor: John D. Northup, 2460 Underhill Road, Toledo, Ohio 43615

[22] Filed: Feb. 28, 1975

[21] Appl. No.: 554,232

[52] U.S. Cl. ................................. 249/59; 425/438
[51] Int. Cl.² ............................................ B29C 1/14
[58] Field of Search ....... 249/59; 425/441, DIG. 58; 264/318; 65/507, 309, 235

[56] References Cited
UNITED STATES PATENTS

| | | | |
|---|---|---|---|
| 2,133,019 | 10/1938 | Campbell | 249/59 |
| 3,150,222 | 9/1964 | Blaustein | 425/441 X |

Primary Examiner—Francis S. Husar
Assistant Examiner—David S. Safran
Attorney, Agent, or Firm—Allen Owen; Thomas M. Frieburger

[57] ABSTRACT

A mold and molded article are disclosed. The article, which may be a container, has a cylindrical portion adjacent one end, including a helical male thread which does not completely encircle the cylindrical portion, with the two ends of the thread obliquely spaced from one another. The parting line of the mold used in producing the article cuts generally perpendicularly to the axis of the cylindrical portion, following the maximum diameter of the helical thread and passing obliquely from one end of the thread to the other. The mold may be used in an injection molding press.

1 Claim, 6 Drawing Figures

U.S. Patent  Dec. 16, 1975  3,926,401
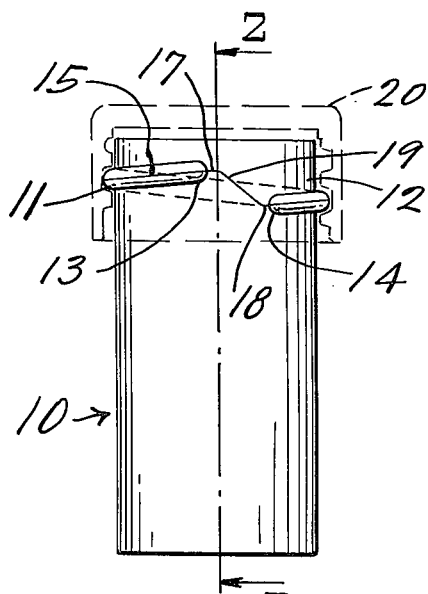
FIG-1-
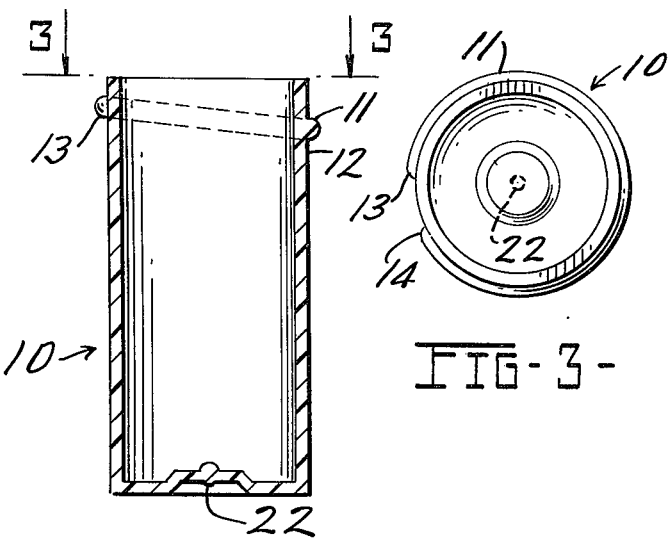
FIG-2-  FIG-3-
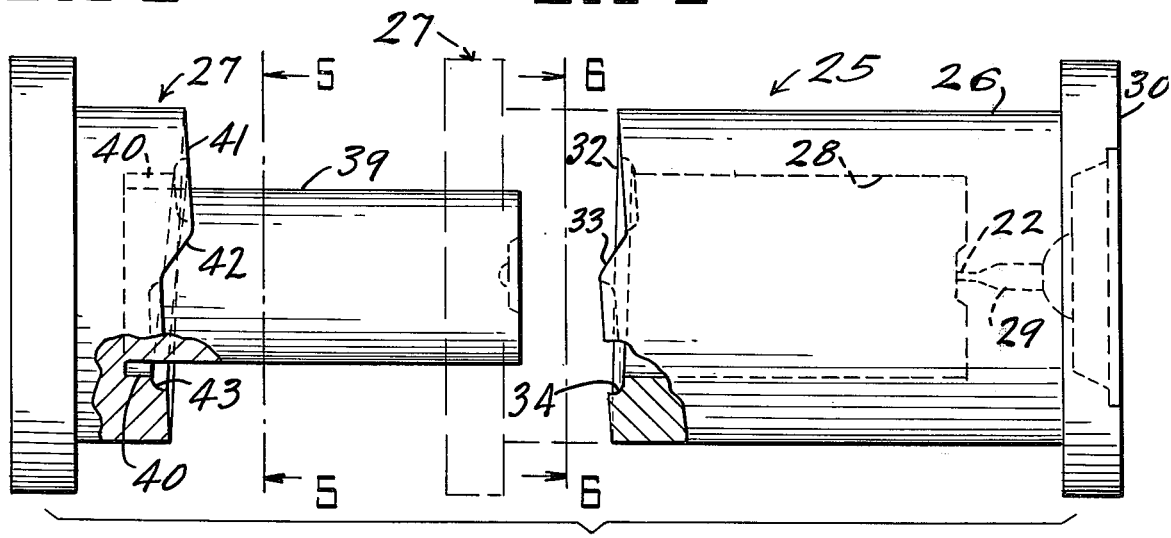
FIG-4-
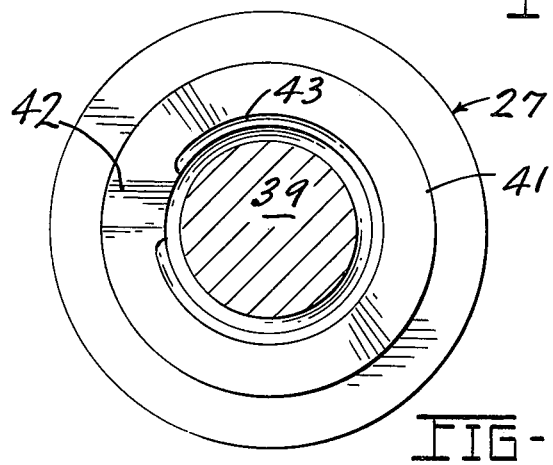
FIG-5-
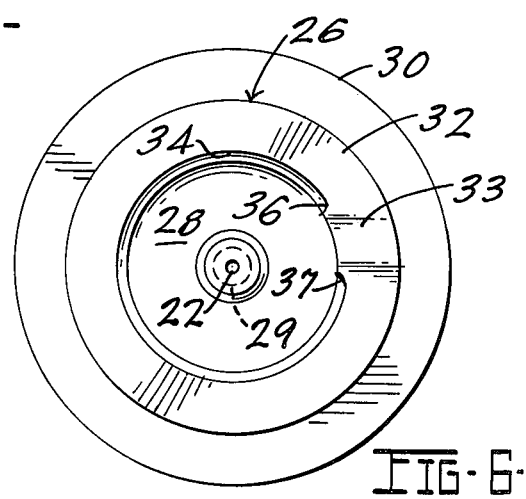
FIG-6-

3,926,401

THREAD MOLD

BACKGROUND OF THE INVENTION

The invention relates to molding, including injection molding, and more particularly to the molding of a male neck thread on an article such as a container.

In the manufacture of glass or plastic containers requiring a screw thread to accommodate a screw cap it is common practice to use a split mold, called a neck ring, to form the thread. The glass or plastic is forced into the contours of the neck ring while in the molten stage. Due to the pressure applied to the material and the cooler temperature of the neck ring the glass or plastic attains a degree of rigidity and conforms to the contour of the neck ring, thus producing the screw threads on the container.

In the manufacture of plastic vials by the injection molding process this split neck ring is also used. Since the plastic is injected under pressure of many thousands of pounds per square inch, the split neck ring must be kept closed by the application of a very substantial force. However, the clamp of an injection press develops all of its force in a direction perpendicular to the force required to hold the neck ring closed while the plastic is injected. In order to use the clamping pressure of the press to hold the neck ring closed, cams or wedges must be designed and built into the injection mold assembly. Furthermore, auxiliary means must be added to cause the neck ring to open, in order to release the finished container, after the clamping pressure has been removed.

This type of injection mold is known as a "cam action" mold. It is much more costly than the normal injection mold and requires substantially more maintenance. Moreover, the number of mold cavities which may be utilized in a particular platen area is generally substantially less if a "cam action" mold is required instead of a conventional mold.

Another type of thread mold parts vertically from the remaining mold portion below the thread, but requires unscrewing of the thread mold from the molded thread. Besides necessitating a great deal of additional equipment, this type mold may encounter problems of sticking to the molded article, particularly in injection nolding. Such unscrewing thread molds are shown in U.S. Pat. Nos. 2,587,837 and 3,150,222.

U.S. Pat. No. 3,431,967 suggests a solution to a problem similar to that of neck thread molding. Undercut portions of a circular lens holder are limited to slightly less than one half the perimeter of the lens opening and the "male" mold for the lens holder is split obliquely, i.e., at a parting angle between horizontal and vertical, between the undercut portions. The mold is stated to be useable in an injection molding press.

SUMMARY OF THE INVENTION

The present invention makes it possible to manufacture a screw threaded article such as a plastic vial without a split neck ring, "cam action" type mold and without an unscrewing type thread mold. This is accomplished by limiting the male thread contour on the article to slightly less than 360° and parting the mold cavity generally perpendicularly to the axis of the cylindrical portion on which the thread is located. Accordingly, two cylindrical mold sections are utilized, with the parting line between the molds following the contour of the maximum diameter of the thread projection, then passing obliquely from one end of the thread to the other. In the injection molding of cylindrical threaded articles, this eliminates the necessity for mold closing forces in more than one direction.

DESCRIPTION OF THE DRAWINGS

FIG. 1 is an elevational view of a molded container according to the invention, indicating a cap adapted to be screwed onto the top of the container;

FIG. 2 is a sectional view of the container, taken along the line 2—2 of FIG. 1;

FIG. 3 is a plan view of the container, taken along the line 3—3 of FIG. 2;

FIG. 4 is an exploded view of an injection mold according to the invention, for producing the container of FIGS. 1 and 2;

FIG. 5 is a sectional view of a portion of the mold, taken along the line 5—5 of FIG. 4; and FIG. 6 is a frontal view of the other mold portion, taken along the line 6—6 of FIG. 4.

DESCRIPTION OF THE PREFERRED EMBODIMENT

In the drawings, FIGS. 1 and 2 show a molded cylindrical article 10, having a helical male thread 11 formed on a neck portion 12 of the article. The thread 11 does not completely encircle the neck portion 12, but rather subtends an angle of less than 360°, with end points 13 and 14 obliquely spaced from one another. The article 10 is molded with a two-piece mold whose part line 15 follows the outer periphery or maximum diameter of the thread 11 and connects the two thread end points 13 and 14. In the portion of the parting line 15 between the thread ends 13 and 14, the part line preferably includes short portions 17 and 18 generally parallel to the helical thread, for reasons of mold design as will be seen below. An oblique line 19 connects the short portions 17 and 18 of the parting line 15.

As FIG. 1 indicates, the thread 11 and neck portion 12 of the container 10 may be adapted to receive a female-threaded cap 20.

The article 10 may be a plastic vial which is preferably formed by injection molding. For the vial 10 shown in the figures, the molten plastic would preferably be injected at 22 (see FIG. 2) to fill the closed mold.

FIGS. 4, 5 and 6 show a mold 25 according to the invention which may be used for producing the neck-threaded molded article 10. Although the mold shown is an injection mold, it should be understood that other types of molds can be employed according to the invention, so long as the neck thread 11 of the molded article 10 is formed in accordance with the above description.

The injection mold 25 includes two mold sections: a "lower" section 26, so denominated herein and in the appended claims because it forms the lower portion of the outside of the vial 10, and an "upper" mold section 27. Of course, in most injection molding presses, the mold 25 would be oriented horizontally. The mold section 26 includes a central mold cavity 28 connected to a gate opening 29 and a fitting 30 for connection to the nozzle of an injection molding press (not shown). As FIGS. 4 and 6 indicate, the upper end of the lower mold section 26 is formed into a helical edge 32 with an oppositely angled bridging portion 33, to define the parting line 15 of the mold 25 as described in reference to the molded article 10 of FIGS. 1, 2 and 3. Around the inside of the helical surface 32 and at the top of the mold cavity 28 is a helical cut out portion 34, which may be, for quarter-round a quarter-rouund shape as shown in the drawings. The cut out portion 34, which forms the lower half of a thread projection of groove for the thread 11 of the molded article 10, does not make a complete turn around the mold cavity 28 but rather stops short of both edges of the angled surface 33. The reason why the thread projection does not reach the interfaces between the surfaces 32 and 33 is to avoid the necessity of sharp points on the mold at ends 36 and 37 of the thread projection 34. Of course, the parting line 19 between the thread ends 36 and 37 need not be of the shape shown in FIG. 4 and FIG. 1—it could alternatively follow an oblique reversed curve path.

The upper mold section 27, seen in FIGS. 4 and 5, includes a central core rod 39 which forms the inside surface of the vial 10. Of course, if the molded article 10 is a solid component rather than a hollow vial, the core rod 39 would not be included. Similarly, if blow molding is utilized rather than injection molding as the final step in the formation of a hollow vial article 10, there would be no core rod 39 on the upper mold section 27.

The upper mold section 27 also includes a cylindrical mold cavity 40 whose diameter is the same as that of the cavity 28 of the lower mold section 26. Surrounding the lower end of the cavity 40 are a helical surface 41 and an oppositely inclined surface 42 which form the lower edge of the upper mold section 27. This lower edge is complimentarily shaped to close in registry with the upper surface of the lower mold section 26. At the inside edge of the helical surface 41 is a helical groove or projection 43 which forms the upper half of the thread 11 of the article 10. The thread projection 43 closes with the lower thread projection 34 to form a helical thread mold, stopping short of the angled surface 42 for reasons discussed above. The upper and lower mold sections 27 and 26 must of course fit together in tight registry along the surfaces 41, 42, 32 and 33 in order to prevent the leakage of molten molding material while high pressure injection molding is taking place. Similarly, the two thread projection halves 43 and 34 should closely match one another in order to correctly form the vial thread 11.

In operation of the mold 25, the two mold sections 27 and 26 are first brought together (in an injection molding press, not illustrated) as shown in FIG. 4 by dashed lines indicating the upper mold section 27. After the mold has been clamped shut and while it continues to be clamped shut, molten plastic is injected into the mold cavity through the gate 29. Significantly, the only mold closing and clamping force required is in an axial direction relative to the vial mold. This is in contrast to a "cam action" type mold as discussed above. Injection is usually accomplished with a plunger or a plasticizing screw positioned in the injection molding machine to travel in a direction parallel to and generally coaxial to the direction of the closure of the mold 25.

The above described preferred embodiment provides a mold and a molded article which significantly lower the cost of producing such an article by utilizing a less expensive mold, allowing the use of more cavities in a particular platen area, and being able to operate at a higher speed per cavity. Various other embodiments and changes to this preferred embodiment will be apparent to those skilled in the art and may be made without departing from the spirit and scope of the following claims.

What I claim is:

1. A mold for forming an article having a male thread, comprising:

a lower mold section comprised of a cavity having a neck portion of a cylindrical shape, the upper end of said lower section having a peripheral edge defining a helically shaped portion subtending an angle of less than 360° and including a pair of end points obliquely spaced from one another, said peripheral edge further including a portion extending between said end points, said helically shaped portion having a larger diameter than the surrounding areas to form a half male thread; and an upper mold section adapted to close in registry with the lower mold section, comprising a cavity having a neck portion shaped according to the neck portion of the lower mold section, the lower end of said upper mold section having a peripheral edge similar to and complementary with the peripheral edge of the lower mold section;

said first and second mold sections, when together in registry, forming a helical male thread mold subtending an angle of less than 3600° and having a parting line following the maximum diameter of the helical male thread.

* * * * *

UNITED STATES PATENT OFFICE
CERTIFICATE OF CORRECTION

PATENT NO. : 3,926,401
DATED : December 16, 1975
INVENTOR(S) : John D. Northup

It is certified that error appears in the above-identified patent and that said Letters Patent are hereby corrected as shown below:

Column 1, lines 45-46, "nolding" should be --molding--.

Column 3, line 1, should read: --may be, for example, a quarter-round shape as--.

Column 4, line 44, "3600°" should be --360°--.

Signed and Sealed this second Day of March 1976

[SEAL]

Attest:

RUTH C. MASON
Attesting Officer

C. MARSHALL DANN
Commissioner of Patents and Trademarks